United States Patent
Van Der Vleuten et al.

(10) Patent No.: US 10,217,198 B2
(45) Date of Patent: *Feb. 26, 2019

(54) SIMPLE BUT VERSATILE DYNAMIC RANGE CODING

(71) Applicant: KONINKLIJKE PHILIPS N.V., Eindhoven (NL)

(72) Inventors: Renatus Josephus Van Der Vleuten, Veldhoven (NL); Jeroen Hubert Christoffel Jacobus Stessen, Eindhoven (NL); Mark Jozef Willem Mertens, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 4 days.

This patent is subject to a terminal disclaimer.

(21) Appl. No.: 15/538,808

(22) PCT Filed: Dec. 22, 2015

(86) PCT No.: PCT/EP2015/080907
§ 371 (c)(1),
(2) Date: Jun. 22, 2017

(87) PCT Pub. No.: WO2016/119979
PCT Pub. Date: Aug. 4, 2016

(65) Prior Publication Data
US 2018/0005356 A1   Jan. 4, 2018

Related U.S. Application Data (60) Provisional application No. 62/109,786, filed on Jan. 30, 2015.

(30) Foreign Application Priority Data

Apr. 14, 2015   (EP) .................................... 15163450

(51) Int. Cl.
*H04N 5/235*   (2006.01)
*G06T 5/00*   (2006.01)
(Continued)

(52) U.S. Cl.
CPC .............. *G06T 5/009* (2013.01); *H04N 5/235* (2013.01); *H04N 5/2355* (2013.01); *H04N 9/69* (2013.01);
(Continued)

(58) Field of Classification Search
CPC . G06T 2207/20092; G06T 2207/20208; G06T 5/009; G06T 2207/20096; H04N 5/2355; H04N 9/69; H04N 5/235
See application file for complete search history.

(56) References Cited

U.S. PATENT DOCUMENTS 5,446,504 A   8/1995   Wada

FOREIGN PATENT DOCUMENTS

EP   2750101 A1   7/2014
WO   2013144809 A2   10/2013
(Continued)

OTHER PUBLICATIONS

Germán Ramos, "Block Processing Strategies for Computationally Efficient Dynamic Range Controllers", Proc. of the 14th International Conference on Digital Audio Effects, Sep. 19, 2011 (Sep. 19, 2011), pp. 253-256.

*Primary Examiner* — Siamak Harandi (57) ABSTRACT

For obtaining an good yet easy to use luminance dynamic range conversion, we describe an image color processing apparatus (200) arranged to transform an input color (R,G,B) of a pixel of an input image (Im_in) having a first luminance dynamic range into an output color (Rs, Gs, Bs) of a pixel of an output image (Im_res) having a second
(Continued)

luminance dynamic range, which first and second dynamic ranges differ in extent by at least a multiplicative factor 2, comprising: a maximum determining unit (101) arranged to calculate a maximum (M) of color components of the input color, the color components at least comprising a red, green and blue component;—a uniformization unit (201) arranged to apply a function (FP) to the maximum (M) as input, which function has a logarithmic shape and was predetermined to be of a fixed shape enabling to transform a linear input to a more perceptually uniform output variable (u); a function application unit (203) arranged to receive a functional shape of a function, which was specified previously by a human color grader, and apply the function to the uniform output variable (u), yielding a transformed uniform value (TU); a linearization unit (204) arranged to transform the transformed uniform value (TU) to a linear domain value (LU); a multiplication factor determination unit (205) arranged to determine a multiplication factor (a) being equal to the linear domain value (LU) divided by the maximum (M); and a multiplier (104) arranged to multiply at least three linear color components (R,G,B) by the multiplication factor (a), yielding the output color.

13 Claims, 4 Drawing Sheets (51) Int. Cl.
 *H04N 9/69* (2006.01)
 *H04N 19/182* (2014.01)
 *H04N 19/98* (2014.01)
(52) U.S. Cl.
 CPC ........... *H04N 19/182* (2014.11); *H04N 19/98* (2014.11); *G06T 2207/20092* (2013.01); *G06T 2207/20096* (2013.01); *G06T 2207/20208* (2013.01)

(56) References Cited

FOREIGN PATENT DOCUMENTS

| WO | 2014025588 A1 | 2/2014 |
| WO | 2014056679 A1 | 4/2014 |
| WO | 2014128586 A1 | 8/2014 |

SIMPLE BUT VERSATILE DYNAMIC RANGE CODING

CROSS-REFERENCE TO PRIOR APPLICATIONS

This application is the U.S. National Phase application under 35 U.S.C. § 371 of International Application No. PCT/EP2015/080907, filed on 22 Dec. 2015, which claims the benefit of U.S. Provisional Application 62/109786, filed on 30 Jan. 2015 and European Patent Application No. 15163450.8, filed on 14 Apr. 2015. These applications are hereby incorporated by reference herein.

FIELD OF THE INVENTION

The invention relates to apparatuses and methods and resulting products like data storage (e.g. blu-ray disk) or transmission products or signals, which enable the conversion of an image, or a video of images, of a first luminance dynamic range to an image or video of second luminance dynamic range, in particular from a reference high dynamic range (HDR) image (e.g. 2000 nit peak brightness of associated reference display) which may non limiting e.g. be a master HDR grading created by a color grader of a content creator to a legacy LDR (100 nit) image. The method and apparatus embodiments are in particular suitable for video encoding respectively decoding which needs to be able to handle higher luminance requirements than legacy (LDR) video coding (which may also be called standard SDR coding).

BACKGROUND OF THE INVENTION

Recently a number of very different displays have appeared on the market, in particular television signal receiving displays (televisions) with very different peak brightness. Whereas in the past the peak brightness (PB) of so-called legacy low dynamic range (LDR) displays differed by at most something like a factor 2 (somewhere between 80 and 150 nits), the recent trend to ever higher peak brightness has resulted in so-called high dynamic range (HDR) televisions of 1000 nits and above, and displays of 5000 nit PB, and it is assumed that soon various displays of such higher PBs will be on the market. Even in movie theaters one is recently looking at ways to increase the ultimate brightness dynamic range perceived by the viewer. Compared to a 100 nit LDR standard legacy TV, a e.g. 2000 nit display has a factor 20 more peak brightness, which amounts to more than 4 additional stops available, i.e. more ways to render brighter objects in various images. On the one hand, provided one uses also a new generation HDR image generation or capturing system, this allows for much better rendering of HDR scenes or effects. E.g., instead of (soft) clipping the sunny world outside a building or vehicle (as would happen in a legacy LDR grading), one can use the additional available brightnesses on the luminance axis of the HDR TV gamut to display bright and colorful outside areas. This means that the content creator, which we will call non limiting the color grader (but he may be embodied in various manners, e.g. in a live television production), has room to make very beautiful dedicated HDR image or video content (typically brighter, maybe more contrasty, and more colorful). On the other hand however, this creates a problem: LDR image coding was designed relatively starting from white, and well-illuminated according to a middle gray of 18% reflection, which means that typically display-rendered luminances below 5% of a relatively low PB of say 100 nit will typically be seen by the viewer as difficult to discriminate dark greys, or even depending on surround illumination indscriminatable blacks. On a 5000 nit display there will be no problem with this optimally graded HDR image: 5% of 5000 nit is still 250 nit, so this will look like a normal interior e.g., and the highest 95% of the luminance range could be used purely for HDR effects, like e.g. lamps, or regions close to such lamps i.e. brightly lit. But on an LDR the rendering of this HDR grading will go totally wrong (as it was also not created for such a display), and the viewer may e.g. only see hot spots corresponding to the brightest regions on a near-black region. In general, re-gradings are needed for creating optimal images for displays which are sufficiently different (at least a factor 2 difference in PB). That would happen both when re-grading an image for a lower dynamic range display to make it suitable for rendering on a higher dynamic range display (which would be upgrading, e.g. a 1000 nit reference display input image(s), i.e. which would look optimal on a 1000 nit PB actual display, which is then color processed for rendering on an actual display of 5000 nit PB), as the other way around, i.e. downgrading an image so that it would be suitable for display on an actual display of lower PB than the reference display associated with the grading which is coded as video images (and which images are typically transmitted in some manner to a receiving side). For conciseness we will only describe the scenario where an HDR image or images is to be downgraded to LDR.

HDR technology (by which we mean a technology which should be able to handle at least some HDR images, but it may work with LDR images, or medium dynamic range images, etc. as well) will percolate in various areas of both consumer and professional use (e.g. cameras, data handling devices like blu-ray players, televisions, computer software, projection systems, security or video conferencing systems, etc.) will need technology capable of handling the various aspects in different ways.

In Wo2013/144809 (and WO2014/056679) applicant formulated generically a technique to perform color processing for yielding an image (Im_res) which is suitable for another display dynamic range (typically the PB suffices to characterize the different display dynamic ranges and hence optimally graded images, since for several scenarios one may neglect the black point and assume it is pragmatically 0) than the reference display dynamic range associated with the input image (Im-in), i.e. which basically formulates the PB of a display for which the image was created as looking optimally, which forms good prior art for the below elucidated invention to improve thereupon. We reformulate the principles concisely again in FIG. 1, in a manner closer to current actual embodiments of the same principle. The various pixels of an input image Im_in are consecutively color processed by a color transformer 100, by multiplying their linear RGB values by a multiplication factor (a) by a multiplier 104, to get output colors RsGsBs of pixels in an output image Im_res. The multiplication factor is established from some tone mapping specification, which may typically be created by a human color grader, but could also come from an auto-conversion algorithm which analyses the characteristics of the image(s) (e.g. the histogram, or the color properties of special objects like faces, etc.). The mapping function may coarsely be e.g. gamma-like, so that the darker colors are boosted (which is needed to make them brighter and more contrasty for rendering on the LDR display), at the cost of a contrast reductions for the bright areas, which will become pastelized on LDR displays. The grader may further have identified some special object like a face, for which luminances he has created an increased contrast part in the curve. What is special now is that this curve is applied to the maximum of the R, G, and B color component of each pixel, named M (determined by maximum evaluation unit 101), by curve application unit 102 (which may cheaply be e.g. a LUT, which may be calculated e.g. per shot of images at a receiving side which does the color processing, after typically having received parameters encoding the functional shape of the mapping, e.g. a gamma factor). Then a multiplication factor calculation unit 103 calculates a suitable multiplication factor (a) for each currently processed pixel. This may e.g. be the output of the tone mapping function F applied to M, i.e. F(M), divided by M, if the image is to be rendered on a first target display, say e.g. a 100 nit LDR display. If an image is needed for e.g. an intermediate display, e.g. 800 nit PB (or another value, maybe higher than the reference display PB of the HDR input image Im_in), then a further function G may be applied to F(M)/M rescaling the amount of multiplicative mapping of the input color to the value appropriate for the display dynamic range for which the image is suited (whether it is directly rendered on the display, or communicated, or stored in some memory for later use).

Figure 1:
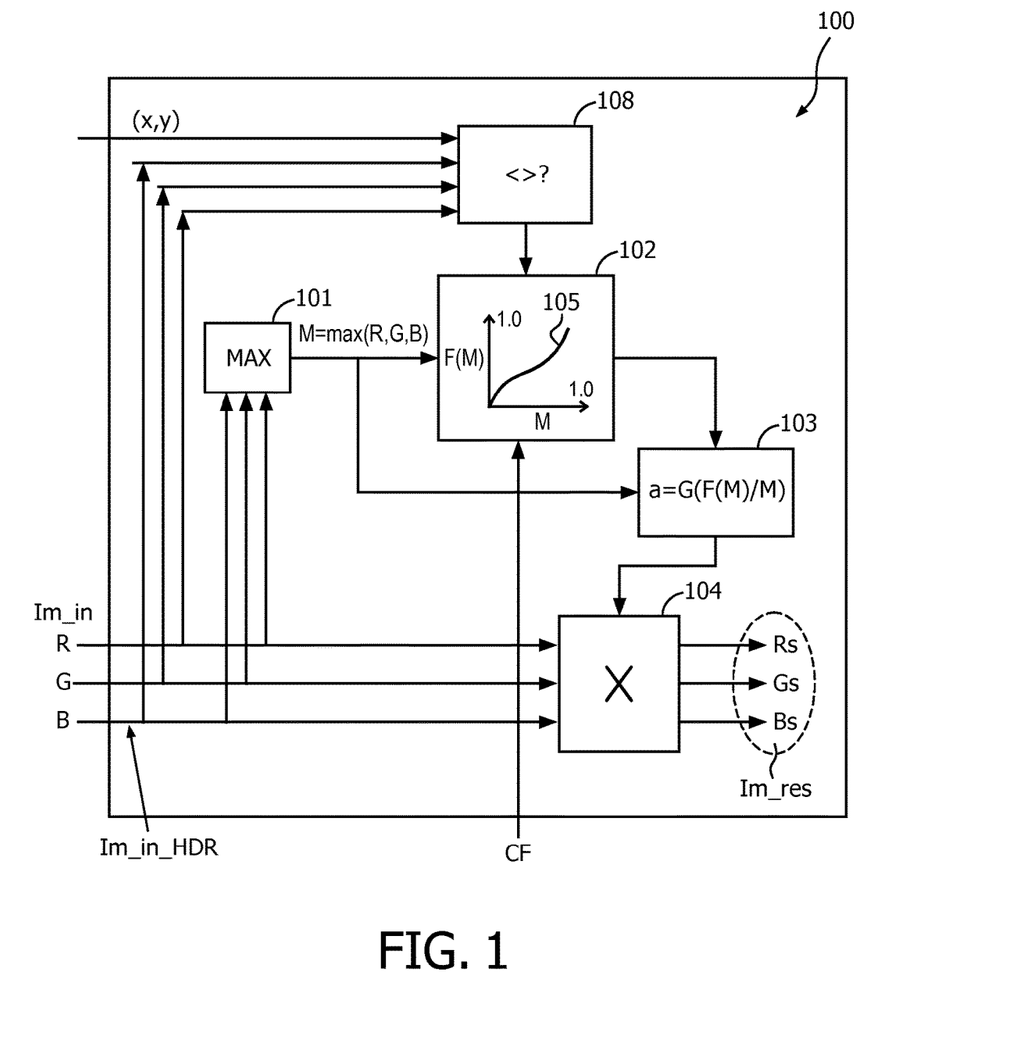
FIG. 1 schematically illustrates a possible color processing apparatus for doing dynamic range transformation including local color processing, which color processing will typically include at least changing the luminances of objects in an input image.

The part we described so far constitutes a global color processing. This means that the processing can be done based solely on the particular values of the colors (and we will only focus on the luminances of those colors) of a consecutive set of pixels. So, if one just gets pixels from e.g. a set of pixels within a circular sub-selection of an image, the color processing can be done according to the above formulated principle. However, since human vision is very relative, also spatially relative, whereby the colors and brightnesses of objects are judged in relation to colorimetric properties of other objects in the image (and also in view of various technical limitations), more advanced HDR coding systems have an option to do local processing. In some image(s) one would like to isolate one or more object(s), like a lamp or a face, and do a dedicated processing on that object. However, in our technology, this forms part of an encoding of at least one further grading derivable from an image of pixels of a master grading (here LDR derived from HDR). Either the master grading or the derived grading may be actually communicated to a receiving side, as the images encoding the spatial structure i.e. the objects of the imaged scene, and if the color transformation functions encoding the relationship between the two looks are also communicated in metadata, then other gradings can then be re-calculated at a receiving side. I.e., the color processing is e.g. needed to construct by decoding an LDR image if needed, in case HDR images have been received, or vice versa a reconstruction of HDR images in case of the pair of looks the LDR images have been communicated, or stored. The fact that the local processing principle is used in an encoding technology has technical implications, inter alia that one needs a simple set of basic mathematical processing methods, since all decoding ICs or software out in the field needs to implement this, and at an affordable price, to be able to understand the encoding and create the decoder LDR image(s). The simple principle which is not too expensive in number of calculations yet sufficiently versatile that applicant introduced in Wo2013/144809, does a grader-specified dual testing by a region evaluation unit 108. This unit evaluates both a geometric and colorimetric condition. Geometrically, based on the coordinates of the current pixel (x,y), it checks e.g. whether the pixel is within a rectangle (x_s, y_s) to (x_e, y_e). Colorimetrically, it can e.g. check whether the luminance or max(R,G,B) is above a threshold (in which case the pixel is evaluated to belong to the to be specially processed region) or below (in which case it is not), or a more advanced evaluation of the color properties of the current to be processed pixel is performed. The color transformer 100 may then e.g. load another tone mapping LUT depending whether the pixel is not in the special region and to be globally processed or to be locally processed, or two parallel processing branches may be used etc.

So, a technical limitation is that from an IC point of view (since also cheap apparatuses may need simple ICs or area parts of an IC, or software), the coding function tools should be few, and smartly chosen, to do what is most needed for the creation and encoding of various dynamic range look images on a scene. On the other hand, a problem with that is that with our above explained philosophy, where a human color grader specifies the re-grading, as encoded by e.g. a HDR image and functions to re-grade to a suitable LDR image, in a set of optimal parameters for the specific look of a given scene, that the grader must also have the right grading/coding tools and in the right order so that he can conveniently work with them (not only does he need to obtain the good precision of the desired color look, but he needs to do that with as few operations as possible, since time is also of the essence). This dual opponent set of constraints need to be provided for in an elegant manner.

There are some teachings which prima facie may look similar, but being designed according to different rationales, are actually technically different. Nevertheless, for completeness we will shortly discuss and differentiate them.

E.g. U.S. Pat. No. 5,446,504 teaches a system being a camera with a better capturing dynamic range.

Similar to our system, is that even when a camera is able to capture a very large dynamic range (rather than clipping to full pixel well, and hence code 255 being untextured/object-detail-lacking white in the MPEG), it still needs to be shown on a LDR display (because nothing else existed in the 1990s).

But that doesn't mean one has a system which is so-designed to be also capable of recovering an original HDR look image, even if an LDR look image of the same scene was communicated, in case one has e.g. a 4000 nit peak brightness display available for rendering it in all its most beautiful and brightest colors.

The beam splitter of FIG. 1A allows one sensor to be sensitive and capture the darker part of a scene, and the other sensor (4b) to be less sensitive (i.e. the pixel wells fill up with photo-electrons much slower), and then the full range of all luminances present in the scene is added together in adder 6 (i.e. instead of having nicely captured colors up to luminance_threshold, and clipping above, now all the brighter pixel colors are still captured in a larger dynamic range).

This system however has only a logarithmic compression function (which arguably could be seen similar to our log function, but—especially on its own—technically has a very different meaning in U.S. Pat. No. 5,446,504), but clearly there is no second customizable re-grading function for which one can bend the non-linear shape however it is needed for a given HDR scene, which can be read being specified previously according to the needs of the particular image(s). Also, no maximum calculation is involved prior to doing the color transformation.

D3=Wo2014/025588 (Dolby laboratories) uses a different philosophy for HDR coding than applicant. Applicant sends just one image of the (HDR, LDR) pair and functions to calculate at the receiving side the other image. Dolby uses a 2-layer (i.e. two images sent, although one may be a simpler image than the one which contains the object textures) approach. They calculate first a "local lighting image", and then a "object properties image", which contains the objects textures, as if better lit. At the reconstruction side they can then obtain the original HDR image by multiplying the object image (the reflectivities) with the local lighting image. Because multiplications and divisions become simpler additions and subtractions, they may like to work in some embodiments in a logarithmic domain (see FIG. 5, subtracting the tone mapped layer TMO RGB, which is their LDR image, which should look reasonable on an LDR 100 nit display). They can then embody the HDR-to-LDR_layer mapping as a curve in the logarithmic axes domain, which can be automatically determined based on the histogram. The philosophy of the components is very different, and in particular a rigid autoconversion framework which cannot be supplemented with a precisely optimized luminance mapping curve from an external place at a creation side, let alone specified by a human color grader according to his specific artistic desires for changing the brightness of some specific object or its luminance range specifically so and so. Also their local illumination-based philosophy would make it very weird to use Max (R,G,B) instead of Ytm (FIG. 2), so that is why they don't teach it.

SUMMARY OF THE INVENTION

The above problem of having a practically usable coding system which is both sufficiently computationally simple for IC to run it at video speed, yet also sufficiently versatile and handy for a grader to specify any detailed color look for displaying on any intended display (at least on HDR display, and another one, typically a legacy LDR display, but the encodings preferably look good on a range of displays, at least in between the HDR display for which the HDR look is encoded, and the LDR display for which the LDR look is co-encoded, by means of the parameters specifying the functional regarding color transformation starting from the HDR image, both images being typically defined as 10 bit words scaled to [0,1]) is solved by an image color processing apparatus (200) arranged to transform an input color having a linear red, green and blue color component representation (R,G,B) of a pixel of an input image (Im_in), which input image has a first luminance dynamic range, into a linear red, green and blue color component output color (Rs, Gs, Bs) of a pixel of an output image (Im_res), which output image has a second luminance dynamic range, whereby the peak luminance of the first dynamic range is at least 2 times higher than the peak luminance of the second dynamic range or vice versa, comprising connected in successive order:
  a maximum determining unit (101) arranged to calculate a maximum (M) of the linear red, green and blue color components of the input color;
  a uniformization unit (201) arranged to apply a function (FP) to the maximum (M) as input, which function has a logarithmic shape and was predetermined to be of a fixed shape enabling to transform a linear input to a more perceptually uniform output variable (u);
  a function application unit (203) arranged to receive a non-decreasing non-linear functional shape of a function, which unit is configured to have access to a previously specified custom function, and is arranged to apply the function to the uniform output variable (u), yielding a transformed uniform value (TU);
  a linearization unit (204) arranged to transform the transformed uniform value (TU) to a linear domain value (LU);
  a multiplication factor determination unit (205) arranged to determine a multiplication factor (a) being equal to the linear domain value (LU) divided by the maximum (M); and
  a multiplier (104) arranged to multiply the linear red, green and blue color components (R,G,B) by the multiplication factor (a), yielding the output color.

The customized function application unit (203) allows that one can design a very specific accurate function, based on the needs of this current HDR scene (in particular how complex it is to puzzle together all the object brightnesses on the much smaller LDR luminance range), in a place where that can be done (with e.g. sufficient time, calculation resources, etc.), i.e. typically at the creation side (and the information of the shape of this function being communicated to a receiving side apparatus). In particular, a human color grader can fine-tune the non-linear shape to bend it in all the appropriate places corresponding to the luminances of major objects or regions of the starting image. He can so brighten e.g. a small part, to any luminance in the derived image as he desires. In particular, if most of e.g. an indoors scene has the correct luminance already, but some small piece of sky seen through a window is too bright or dark, the custom curve CC can be so designed to color transform only those pixel colors. For some specific embodiments the custom curve can even be so designed that it's gradient doesn't go below a minimum value anywhere along the input range. We designed our system to be able to fit in various kinds of HDR image or video handling systems in the future market (e.g. broadcasting, LDR-based over existing satellite channels; versus internet-delivery), and various kind of content (very spectacular HDR artistic images from Hollywood, versus an in the field production, which happens to have the dynamic range it happens to have), so our custom curve unit allows for implementing whatever specific luminance (brightness) behavior for whichever parts of an image need it, and in the various implementations with however much or little implementation effort on the creation side this may have been realized with.

Advantageously to reduce the grading effort needed by for at least easy HDR scenes offering a quick adjustment which may already be reasonable without further customized fine-tuning to differentially change the average luminances and/or intra-object contrasts of at least one image object in the image, an image color processing apparatus (200) comprises in between the uniformization unit (201) and the function application unit (203) a coarse mapping unit (202) arranged to apply a coarse soft-clipping brightening function which is formed by a number of connected function segments which together span the input domain range of the function, and which are controlled by respective segment shape control parameters, which can be specified previously, e.g. by the human color grader during creation of the two different dynamic range looks of the HDR content. The custom function of unit 203 may then be applied if still desired by the grader, and its parameters defining the functional shape stored for later use (e.g. as metadata in addition to the HDR images on a blu-ray disk), or transmitted to a receiving end as an image signal S_im, e.g. over internet, a broadcast channel, etc. The functional shape of the custom curve should typically be monotonous. It may have parts which are not increasing (i.e. several successive HDR input values giving the same LDR output luminances), but to retain the order of the grey values of the various objects in the LDR graded image compared to the HDR grading, there should be no decreasing parts in the function generally. However, besides this, the shape can be arbitrary to e.g. finetune the contrasts of certain objects, like e.g. a man needing to be partially visible in the mist.

Advantageously the image color processing apparatus (200) has the coarse mapping unit (202) arranged to apply a three-segment curve which consists of a linear segment for the darkest input values, and is controlled by a slope variable, a second linear segment for the lightest input values, controlled by a second slope variable, and a parabolic segment in between the two linear segments. This is a simple function for the grader to apply, which already gives good control over some kinds of HDR images. Of course, this three part curve may be integrated in e.g. a 6 or 9 part curve, but the unit 202 offering an option to start with a three-part curve, and convert it to a 6-part curve if needed (e.g. the linear segment for the lightest values may be converted to a non-linear shape, which is e.g. determined by two tangents, etc.). Unit 202 is shown dashed, because in some actual embodiments (e.g. ICs, or software, e g running on a PC to encode a LDR look from an HDR look, with the herein described parameters), it may not be an actual calculation unit before the unit 203 which can use functions of arbitrary shape, but rather it may be a starting point of that arbitrary shape, which if not sufficient can be further transformed by adding e.g. an S-shaped part for having locally increased contrast of objects of some particular grey values, or a bump somewhere etc. I.e. in that case the apparatus will only physically have unit 203, but not 202.

Typically, though not necessarily, the input image would be a high dynamic range image, and the output image a low dynamic range image. Note that these methods and apparatuses can be used both to convert from an HDR image to an LDR image, or vice versa upgrade an LDR image to an HDR image, and both on an image or video creation, intermediate, or consumption site.

The following further embodiments are also useful.

A method of image color processing to transform an input color having a linear red, green and blue color component representation (R,G,B) of a pixel of an input image (Im_in), which input image has a first luminance dynamic range, into a linear red, green and blue color component output color (Rs, Gs, Bs) of a pixel of an output image (Im_res), which output image has a second luminance dynamic range, whereby the peak luminance of the first dynamic range is at least 2 times higher than the peak luminance of the second dynamic range or vice versa, comprising:

- calculating a maximum (M) of the linear red, green and blue color components of the input color;
- applying a uniformization function (FP) to the maximum (M) as input, which function has a logarithmic shape and was predetermined to be of a fixed shape enabling to transform a linear input to a perceptually uniform output variable (u);
- receiving parameters defining a non-decreasing non-linear functional shape of a function (CC), which was previously specified, and applying the function (CC) to the uniform output variable (u), yielding a transformed uniform value (TU);
- transforming the transformed uniform value (TU) to a linear domain value (LU) by applying a linearization function (FL);
- determining a multiplication factor (a) being equal to the linear domain value (LU) divided by the maximum (M); and
- multiplying the linear red, green and blue color components (R,G,B) by the multiplication factor (a), yielding the output color (Rs, Gs, Bs).

Note that our present apparatus and method embodiments make it in principle possible to where we use a maximum of the red, green and blue color components, also use a luminance, or even per pixel decide whether to use the luminance or maximum for that pixel, or even weighed combinations, but that leads to different embodiments with different behavior.

A method of image color processing to transform an input color as claimed in claim 5, comprising between the steps applying a uniformization function (FP) and applying the function (CC) a step of: applying a coarse soft-clipping brightening function which is formed by a number of connected function segments which together span the input domain range of the function, and which are controlled by respective segment shape control parameters, which have been specified previously.

A method of image color processing to transform an input color in which the step of applying a coarse soft-clipping brightening function is characterized by applying a three-segment curve which consists of a linear segment for the darkest input values, which is controlled by a slope variable, a second linear segment for the lightest input values, which is controlled by a second slope variable, and a parabolic segment in between the two linear segments. This allows for very good control of the most interesting regions of a HDR scene, and how it needs to be squeezed in a LDR image.

A method of image color processing in which the input image is a high dynamic range image, and the output image is a low dynamic range image.

A computer program product comprising code codifying each of the steps of any of the method embodiments, thereby when run enabling a processor to perform that method.

An image color processing apparatus (200) arranged to transform an input color having a linear red, green and blue color component representation (R,G,B) of a pixel of an input image (Im_in), which input image has a first luminance dynamic range, into a linear red, green and blue color component output color (Rs, Gs, Bs) of a pixel of an output image (Im_res), which output image has a second luminance dynamic range, whereby the peak luminance of the first dynamic range is at least 2 times higher than the peak luminance of the second dynamic range or vice versa, comprising:

- a maximum determining unit (101) arranged to calculate a maximum (M) of the linear red, green and blue color components of the input color;
- a uniformization unit (201) arranged to apply a function (FP) to the maximum (M) as input, which function has a logarithmic shape and was predetermined to be of a fixed shape enabling to transform a linear input to a more perceptually uniform output variable (u);
- a coarse mapping unit (202) arranged to arranged to apply a three-segment curve which consists of a linear segment for the darkest input values, which is controlled by a slope variable, a second linear segment for the lightest input values, which is controlled by a second slope variable, and a parabolic segment in between the two linear segments, and arranged to output a transformed uniform value (TU);
- a linearization unit (204) arranged to transform the transformed uniform value (TU) to a linear domain value (LU);

a multiplication factor determination unit (205) arranged to determine a multiplication factor (a) being equal to the linear domain value (LU) divided by the maximum (M); and a multiplier (104) arranged to multiply the linear red, green and blue color components (R,G,B) by the multiplication factor (a), yielding the output color.

A method of image color processing to transform an input color having a linear red, green and blue color component representation (R,G,B) of a pixel of an input image (Im_in), which input image has a first luminance dynamic range, into a linear red, green and blue color component output color (Rs, Gs, Bs) of a pixel of an output image (Im_res), which output image has a second luminance dynamic range, whereby the peak luminance of the first dynamic range is at least 2 times higher than the peak luminance of the second dynamic range or vice versa, comprising:

calculating a maximum (M) of the linear red, green and blue color components of the input color;

applying a uniformization function (FP) to the maximum (M) as input, which function has a logarithmic shape and was predetermined to be of a fixed shape enabling to transform a linear input to a perceptually uniform output variable (u);

applying a three-segment curve which consists of a linear segment for the darkest input values, which is controlled by a slope variable, a second linear segment for the lightest input values, which is controlled by a second slope variable, and a parabolic segment in between the two linear segments, yielding a transformed uniform value (TU);

transforming the transformed uniform value (TU) to a linear domain value (LU) by applying a linearization function (FL);

determining a multiplication factor (a) being equal to the linear domain value (LU) divided by the maximum (M); and multiplying the linear red, green and blue color components (R,G,B) by the multiplication factor (a), yielding the output color (Rs, Gs, Bs).

A video decoder (550) comprising:

an input (556) for receiving an input image (LDR_ienc);

an image decoding unit (555) arranged to decode the input image to a linear red, green and blue color component pixellized representation, and arranged to receive metadata characterizing at least luminance processing functions;

an image color processing apparatus (552) as claimed in one of the apparatus claims, characterized in that the image color processing apparatus is arranged to receive and process the input image by applying color transformation functions as defined bt the received metadata, and to yield a linear red, green and blue color component pixellized output image.

A video encoder (501) comprising:

an input (509) for receiving an input image (IM_IN);

an image color processing apparatus (503) as claimed in one of the apparatus claims, characterized in that the image color processing apparatus is arranged to process the input image by applying color transformation functions, and to yield a linear red, green and blue color component pixellized output image (IMED); and an image encoding unit (505) arranged to encode output image (IMED) to an encoded output image (LDR_o-enc), and arranged to output metadata characterizing at least luminance processing functions.

BRIEF DESCRIPTION OF THE DRAWINGS

These and other aspects of any variant of the method and apparatus according to the invention will be apparent from and elucidated with reference to the implementations and embodiments described hereinafter, and with reference to the accompanying drawings, which drawings serve merely as non-limiting specific illustrations exemplifying the more general concept, and in which dashes are used to indicate that a component is optional, non-dashed components not necessarily being essential. Dashes can also be used for indicating that elements, which are explained to be essential, are hidden in the interior of an object, or for intangible things such as e.g. selections of objects/regions, indications of value levels in charts, etc.

In the drawings.

DETAILED DESCRIPTION OF THE DRAWINGS

FIG. 1 schematically shows our system to encode (at least) two graded images for rendering on displays of considerably different dynamic range (PB), and in particular a color transformation core unit thereof. The skilled reader understands that this system can both reside at a content creation side, in which the human grader will do the calculations to check on calibrated displays which looks he is actually making when at the same time specifying the according to his taste optimal parameter values of our grading functions in the coding function toolkit, and at a receiving side, where the apparatus may be included e.g. in a video receiving and color processing device like a settopbox, BD player, or computer, or a display itself, or a professional system in a movie theatre, etc.

We will elucidate the receiving side, where we already have the data specifying the two gradings (HDR and LDR, which can then further be optimized by further calculations for any intermediate dynamic range MDR display of e.g. PB=800 nit).

So according to our novel encoding principles, the receiving apparatus actually has only one image actually encoded (e.g. classically in a 10 bit HEVC encoding, though understandably decodable to a normalized [0,1] image), Im_in_HDR, e.g. received on a blu-ray disk, or via an internet connection to a video server, or over an HDMI cable from some other apparatus, etc. This then has to be calculated into an LDR grading, e.g. because an LDR display is connected, and needs the correctly graded LDR image (e.g. the viewer decides to stop watching his living room HDR display but continue watching in bed on his portable pad PC).

To be able to do the color processing, the color transforming apparatus also needs the parameters (CF) specifying the functions. The skilled person understands that e.g. a parabola could be specified by a starting and end point, and a linear starting slope and curvature, etc.

Typically both saturation control of the mapping from HDR to LDR may be involved but also at least a mapping which affects the luminances of the output objects (although mathematically we typically apply that luminance mapping by multiplicatively scaling linear RGB color components).

Figure 2:
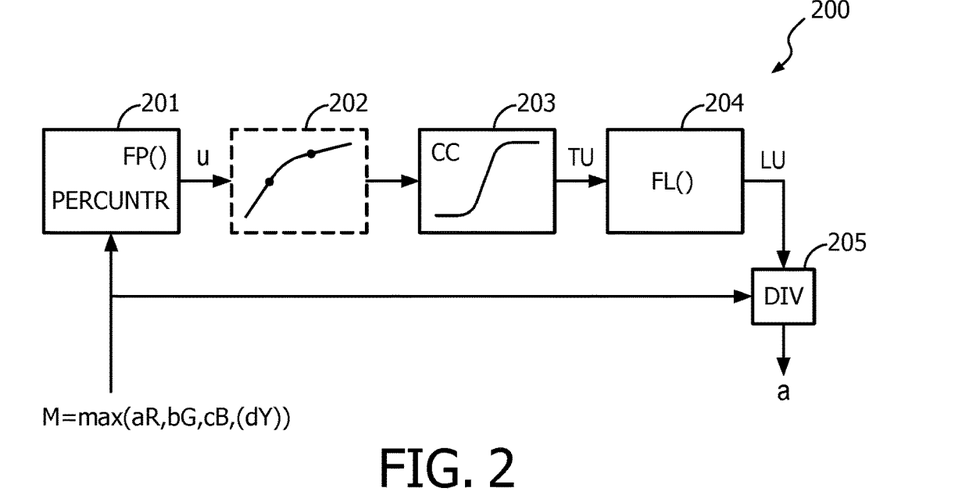
FIG. 2 schematically illustrates an example of a system which is arranged to do a dynamic range transformation for a system which is able to encode in a parametric manner both a HDR and an LDR image, whereby only the HDR image pixel colors are actually transmitted to a receiving side, and the LDR image is encoded only indirectly, by the transmission of a set of color transformation function defining parameters, which allow the LDR image to be calculated from the received HDR image pixel color image data, which system is easy yet versatile for a human color grader to use.

FIG. 2 shows in more detail how preferably we do that luminance re-grading.

The uniformization unit (201) performs a transformation to a representation which is more visually uniform for a human. In contrast to classical LDR processing, especially for HDR images (which may contain luminances up to e.g. 20000 nit) it is very important that the grader has good more meaningful control over his grey values. If they are perceptually reasonably uniformly spread, e.g. each N codes correspond to J just noticeable differences (i.e values 10 out of 1203 may be a dark barely visible in a dark surround black-grey, 15 may be a just slightly lighter black-grey, 20 may be about the same amount lighter again), the grader has much better control over how he can reallocate the brightnesses and lightnesses of the object, e.g. to hide a criminal in a dark corner of a room, or make a flashy HDR light effect etc. In a linear space the grader has bad control, e.g. cannot see very well what he is doing in the blacks, immediately does too much, etc.

A preferred function to obtain such a uniform version of any linear input (M) is the following:

$$u = \frac{\log\left(1 + (\rho - 1) \times M^{\frac{1}{\gamma}}\right)}{\log(\rho)}$$

Where rho is a constant and M the maximum of R, G, B (suitably weighed with weights which are either preset to e.g. 0.5, 1.0.25, or respecified according to the image by the grader), and possibly also Y (otherwise the weight d of Y is set to 0; these weights will also be received together with the image data, e.g. on BD).

Rho may e.g. be 33 and gamma 2.4, in case the reference PB corresponding to the HDR image is 10000 nit.

For other PBs the grading side apparatus will determine rho e.g. with the equation:

$$\rho = 33^{\left(\frac{\log\left(1 + (33-1) \times \left(\frac{L_{HDR}}{10000}\right)^{\frac{1}{\gamma}}\right)}{\log(33)}\right)}$$

Note that one need not necessarily apply the function to the luminance of pixels. Any weighed color component with a predetermined weight a, e.g. a*R, R being the red color component in [0,1], coming out of the maximum calculation which maximum may or may not also have a linear weighed luminance d*Y as fourth input potentially being selected as the highest of the four inputs, may also be used as a correlate of the pixel luminance and serve in the determination of the multiplicative factor (a) for appropriately doing the multiplicative brightness scaling of the input color (R,G,B).

The function application unit (203) applies a customized mapping curve, so that the grader may easily make each object bright and contrasty as he desires. In our dual grading encoding technology, this curve will typically be specified by a number of points (u_in, TU_out) defining the functional shape with linear segments (which may also be rounded somewhat near the connections). E.g. (0, TU_1) would give the offset of the black, i.e. to which output a zero input would map, and then (u_2, TU_2) would determine a segment defining the mapping for all inputs up to u_2, etc.

The linearization unit, will convert back to the linear domain, because the multiplicative factor will be determined as a division of two linear quantities (for more information included in its entirety are the teachings of Wo2014/056679).

Figure 3:
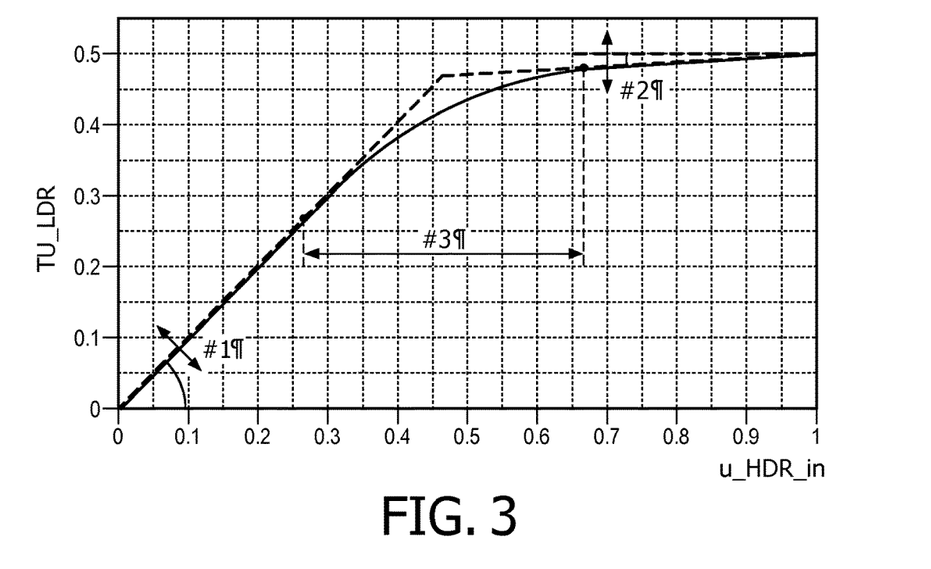
FIG. 3 shows a functional shape of one possible coarse initial luminance mapping for coding LDR from HDR image pixel color data.

A good embodiment of the coarse mapping unit (202) will apply a function like e.g. in FIG. 3. The position of the parabolic segment may be determined by encoding a starting and end u-value, but the parabola can also be encoded as a width of it, as in FIG. 3. The input is the linearized version of M, namely u_HDR_in, and the output TU_LDR_out is what can afterwards be finetuned by the custom-shaped curve of unit 203.

In this embodiment the basic "parabola" tone mapping curve consists of 3 segments:
 a dark segment through (0, 0), which is controlled by the parameter slope bg (base gain)
 a bright segment through (u_max, TU_max), with slope dg (differential gain)
 parabola segment that connects the two, with width xp (x-width parabola)

Without the parabola, the 2 linear segments connect in the point $um = (TU\_max - dg*u\_max)/(bg - dg)$, $TUm = bg*um = TU\_max - (u\_max - um)*dg$.

We make a continuously differentiable curve by adding a parabola which is centered around this (um, TUm), and it must begin with slope=bg and end with slope=dg. From mathematical calculation we then get that only 1 (of 3) degree of freedom is left: the width of the parabola xp.

Depending on the width, the y value for u=um drops from $TU = TUm$ for $up = 0$ to $TU = TUm - \text{delta}\_TU = TU - up*(bg-dg)/8$.

One can invert this relation for calculating up from delta_TU:

$up = 8*\text{delta}\_TU/(bg-dg)$.

So typically one can start with up=0, then see what the maximum distance delta_TU is between the bent curve and the reference luminance mapping curve (scatter plot), and calculate up from this.

So in this embodiment the width (typically between 0.0 and 1.0) of the parabolic segment will be the third parameter specifying this functional shape which is communicated to any receiving side apparatus, in addition to the base gain slope (e.g. with typical values between 0.5 for bright images and 1.0 for dark images), and the lightest inputs range slope (typically between 0.0 and 0.25).

In FIG. 2 we see just two examples of the many possible HDR scenes a HDR system of the future (e.g. connected to a 1000 nit PB display) may need to be able to correctly handle, i.e. by creating the appropriate luminances for all objects/pixels in the image, in the ultimately to be rendered image on whatever connected or envisaged to be connected display. E.g. ImSCN1 is a sunny outdoors image from a cowboy movie playing in Texas, and ImSCN2 is a nighttime image. What makes HDR image rendering different from how it always was in the LDR era which ended only recently (or actually is going to start in the market the coming years), is that the LDR had such a limited dynamic range (about PB=100 nit, and black level+−1 nit, or even higher in brighter viewing environment due to screen reflections), that mostly only the reflectivities of the objects could be shown (which would fall between 90% for good white and 1% for good black). So one had to show the objects independent of their illumination, and couldn't at the same time faithfully show all the very nice sometimes highly contrasty illuminations of the scene that could happen. In practice that meant that the highly bright sunny scene had to be rendered as the same display luminances (0-100 nit) as a dull rainy day scene. And even the night time scenes could not be rendered too dark, or the viewer would not be able to well-discriminate the darkest parts of the image, so again those night time brightnesses would be rendered spanning the range between 0 and 100 nit. So one had to conventionally color the night scenes blue, so that the viewer would understand he was not looking at a daytime scene. Now of course in real life human vision would also adapt to the available amount of light, but not that much (most people in real life recognize that it's getting dark). So one would like to render the images with all the spectacular local lighting effects that one can artistically design in it, at least if one has a HDR display available.

Figure 4:
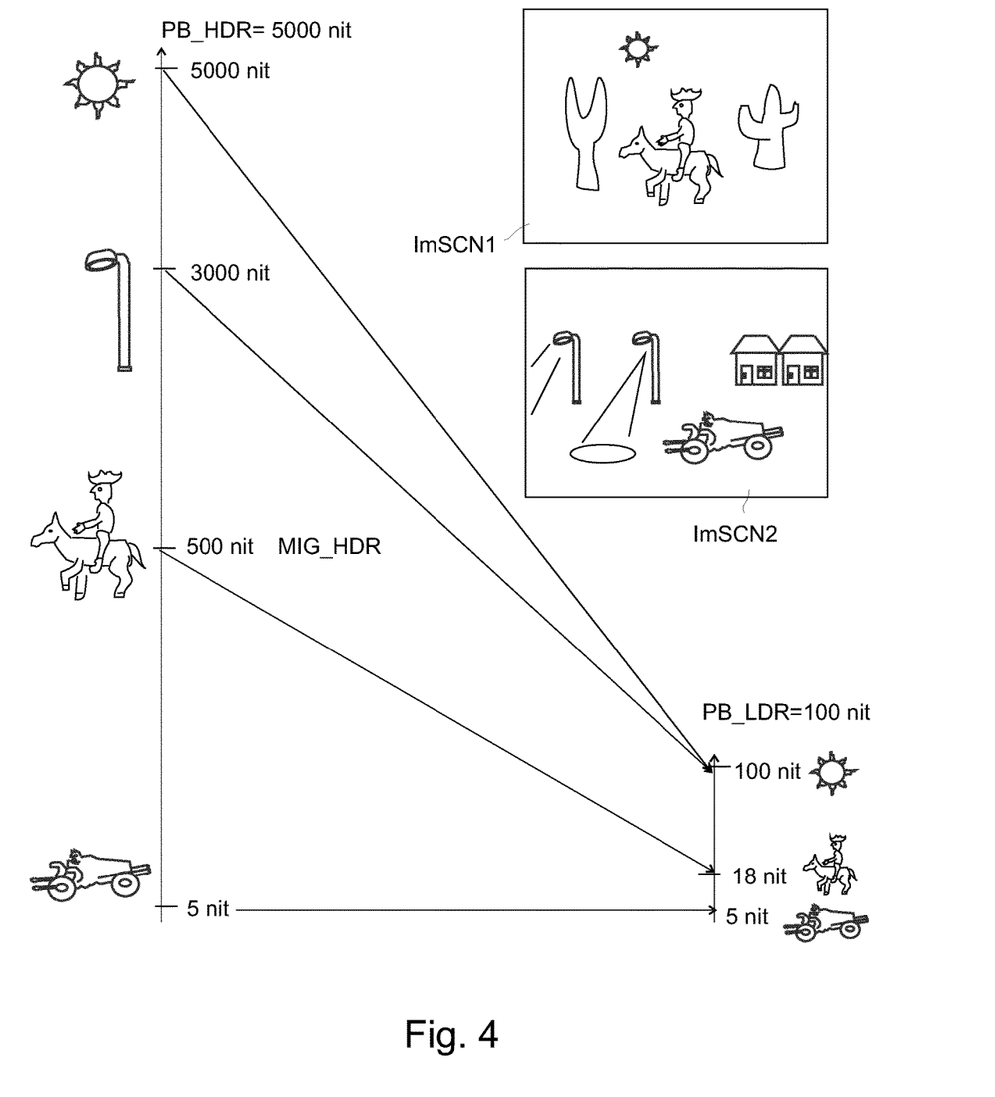
FIG. 4 clarifies with a couple of examples what the technical and artistic issues typically are with HDR content which needs to be viewable on displays of lower dynamic range, even an installed base of legacy 100 nit peak brightness (PB) SDR displays.

But that doesn't change the fact that for some people we would still need to downgrade a fantastic new HDR movie to that limited LDR display (the range of which is shown, not to exact scale, on the right of FIG. 4).

So on the left we see what object luminances we would like to see in a 5000 nit PB (i.e. optimized for rendering on a 5000 nit PB display) master HDR grading. If we want to convey not just an illusion, but a real sense of the cowboy being in a bright sunlit environment, we must specify and render it's luminances around e.g. 500 nit. From these examples alone one can already get a feeling that puzzling all objects together on the smaller LDR luminance range is ideally not going to be a matter of simple compression (e.g. with a linear function mapping the HDR PB to the LDR PB, and therewith all lower luminances also). On the contrary, we give two examples of different luminance mapping-behavior class. For the daylight scene, if one wanted to calculate the HDR image from a received LDR image, one could apply indeed a stretching function, which stretches all luminances in such a manner that in particular the cowboy being rendered around an LDR middle grey of 18 nits maps to 500 nit in HDR (i.e. approximately a 30 times brightness increase). But one wouldn't want to do that for the night scene, or it would become ridiculously bright on the HDR monitor (actually diving into details, because of some image specifics the brain might still imagine it is seeing a night scene even when too bright, but it is rendered far from ideally, if one really want a spectacular and high quality HDR rendering, now that has become possible). For this ImSCN2, one wants the luminances of all dark objects in the night to be the same on the two displays (and all displays of intermediate PB). Rather it is the light pole light, and maybe the moon which is brightened to a very much brighter luminance in the HDR image. So the shape of the luminance mapping function will be very different. One can imagine that if one has aspects of those two archetypical images together in one image, e.g. taken inside a cave and watching the sunny outside through a small hole, one may want to desing complex luminance mapping curves indeed, to get both the LDR and HDR object luminances according to ones artistic desire. How such situations typically happened in the LDR era is that one just clipped everything outside the cave to white. Or, because in the LDR era one just considered what the camera captured as relative luminances, irrespective of their meaning and what that would imply for their ultimate rendering on whatever display, some parts of the image often became too dark. E.g., if one walks through the corridor and sees the sun shining in, these sunlit spots look very bright. The other parts of the corridor are relatively darker, but that doesn't mean the person walking there sees them any darker as normal (actually, because of the extra illumination even the parts in the shadow will look somewhat brighter than if the sun moves behind the clouds). But an LDR rendering putting these sunny colors near white, can only render the shadow parts of the corridor too dark, because otherwise the only thing it can do on its limited range is render the shadows at a reasonable luminance, but then everything in the sun clips above max. luma code, e.g. 255, respectively a rendered 100 nit.

So the optimal LDR rendering of such a scene is a complex design issue, but at least now with HDR displays we could rendered the sunny parts realistically, i.e. above a certain luminance. E.g. if the viewing environment corresponds roughly to 200 nit, we can render the shadowy parts of the image around 200 nit. And we can render the sunlit parts—depending on the PB of the display—at e.g. 2000 nit. Even if that is not always exactly the same relative amount above the shadow luminance as in real life, at least it will look much more realistic than a corridor which is much too dark, or clipping.

But the reader understands why all this complexity, in particular the many kinds of image one can encounter, and the huge difference between at least some higher quality HDR ranges (e.g. PB=10,000 nit) and the SDR 100 nit range, call for a system which allows precise specification of the various pixel colors and in particular their luminances. And applicant in particular had the philosophy that one should allow the content creator to influence how any other dynamic range image will be calculated from the received image(s), at least for those who desire so, and to the extent they desire to do so, and to the extent of what they minimally need to specify.

Figure 5:
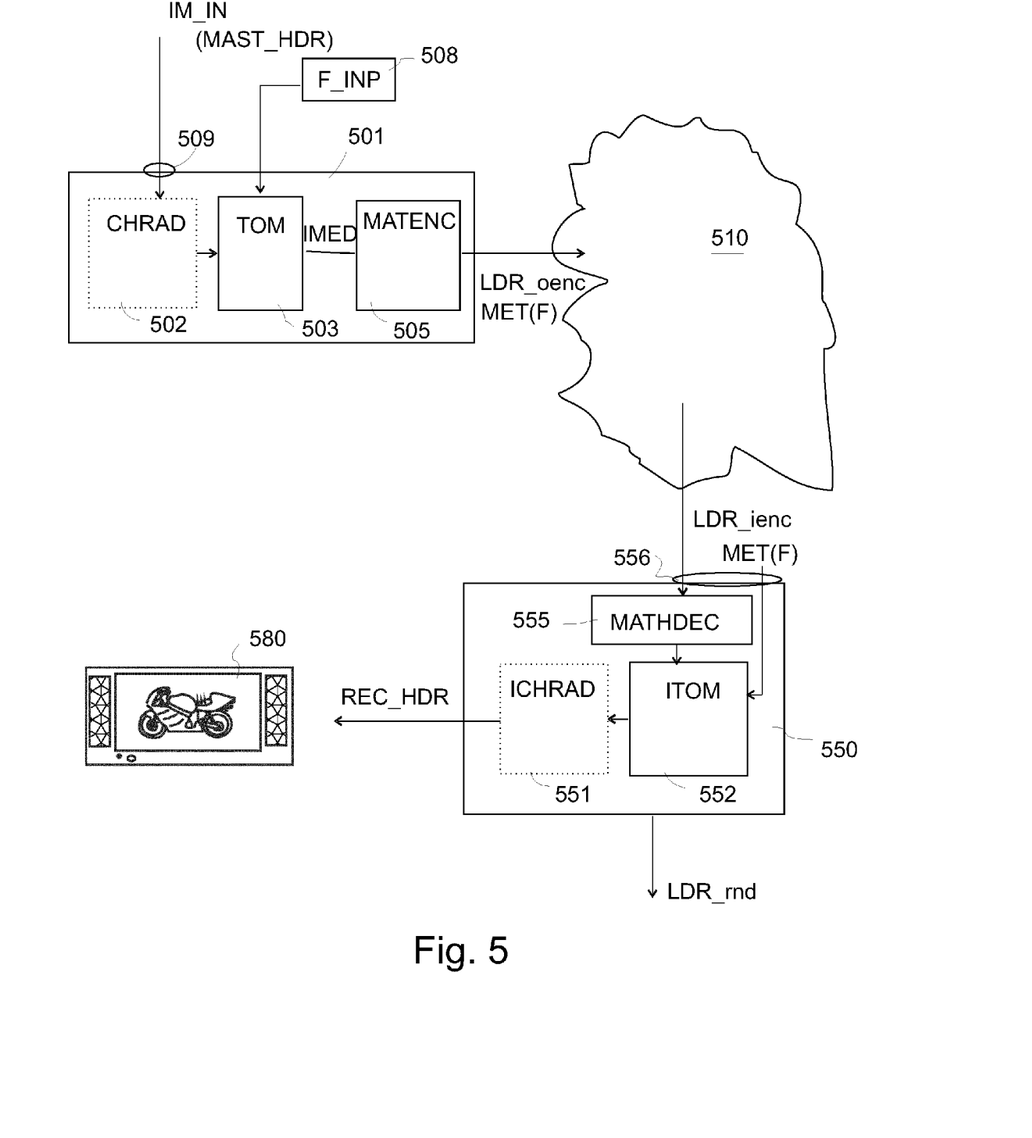
FIG. 5 schematically elucidates a little further an exemplary video coding system in which applicant's apparatus and method embodiments may advantageously be used.

FIG. 5 shows a possible incorporation of our basic luminance changing apparatus (or method). The skilled person will understand how e.g. a grader can use UI components to change the shape of any functions, e.g. their characterizing parameters, according to his needs or desires. We would like to emphasize that although we will elucidate a mode-ii example (wherein the LDR image downgraded from the master HDR image MAST_HDR that the content creator made, e.g. from his raw capturings, is actually communicated, and then at a receiving side when needed reconstructed to a close approximation of the MAST_HDR image), the system, and our apparatus embodiments can also be used in a mode-i operation, in which the MAST_HDR image is actually communicated, and the apparatus applies the luminances downgrading in a receiver in case an LDR image is needed for supplying to a SDR display. Each of those received LDR or HDR images can also be converted to images of different dynamic range, e.g. 1499 nit PB. And, the apparatus embodiments can also be incorporated in a creation-side apparatus, e.g. an encoder, e.g. to allow a color grader to check what will happen on the receiving side, and how with the given functions the LDR image calculated from the MAST_HDR will look, and the apparatuses and methods can also be used in transcoders at any intermediate location, e.g. a viewing booth of a local content distributor, etc.

A video encoder 501 in this exemplary scheme get via an input 509 and input image IM_IN, which we for simplicity of elucidation will assume is an already artistically created master HDR grading, but it may also be a HDR image from some raw image feed, which needs to be minimally color-processed with little real-time interference, etc.

There may also be chromatic processing involved calculated on the pixel colors by chromatic processing unit 502, e.g. a saturation change which reduces the saturation so that in the LDR conversion the brighter colors of e.g. a stained glass window can be extra brightened by pushing them in the narrow top of the LDR color gamut near white. Then a luminance mapping unit 503 will do the various things any of our apparatus embodiments does as shown in FIG. 2, e.g. a luminance uniformization and then the three-part curve, or, the uniformization and then some optimally shaped function CC, determined for the current set of images, and loaded in by user interface interaction or from metadata encoding a previously determined function. A function input means 508 can be understood by the reader as e.g. typical color grading tools, or a connection to a database storing at least one function, or a connection to a remote human grader, etc. Then this intermediate image IMED, which now in this example is an LDR image with pixel luminances distributed along the 0-100 nit LDR range, which may still be encoded as a linear RGB image, is encoded with typical legacy LDR encoding technology like e.g. HEVC by image or video encoding unit 505. This is because this "looks" like a regular LDR image, at least for the following technologies, like the image distribution pipeline it will go through, despite it actually encoding a HDR scene HDR image. We tell any receiver this by also transmitting the color transformation functions (or their inverse functions) used for generating the LDR image from the master HDR image, which tells the receiver not only that he actually receives an HDR image instead of a regular LDR image, but also allows the receiver to reconstruct a close approximation of the MAST_HDR image, by applying those received inverse functions to the received LDR image(s). So the encoded image or video LDR_oenc actually functions as a normal LDR video for the rest of the system, and it will travel through some communication means 510, which may e.g. be a aerial broadcast, or an internet connection, or a physical memory being transported to whatever consumer or professional (e.g. cinema) location, etc.

At the receiving end this encoded output image (LDR_oenc) becomes an input image or video LDR_ienc (it may still have undergone further transformation, but we assume for explanation purposes it is the same image(s) looped through). We should shortly note that if we use a mode-i HDR communication system in LDR_oenc, we may have used a different shape of the functions than in mode-ii, giving the image different object brightnesses and statistics, but both will be e.g. HEVC encoded.

A video decoder 550 gets via its input 556 both the images and the metadata MET(F) encoding the functions, in particular the optimal custom curve that was chosen at the creation side e.g. by a color grader or some other person like a technical director of a life production etc. An image or video decoding unit (555) decodes the HEVC video, and then it is color-processed by a luminance mapper 552 embodying any of our apparatus or method embodiments, and the by a chromatic processing unit 551 doing the inverse e.g. desaturation, i.e, a saturation increase, in case that was specified for this content. Finally the correctly graded REC_HDR e.g. 5000 nit PB image(s) can be sent to a display 580, e.g. a 5000 nit display ideally (in case of mismatch of PB between the HDR content and the display, either this video decoder, e.g. embedded in a STB may already display-tune the image by appropriate color transformation to the needed e.g. 2500 nit display PB, or the display may do that internally by having its own version of our taught apparatuses/methods). Of course if a legacy SDR 100 nit display is to be supplied with the appropriately graded content, the video decoder 550 may supply a LDR image LDR_rnd to it, which in this example may just be the decoder received LDR images without a need of further color transformation, but in case of receiving HDR images in LDR HEVC containers, the video decoder 550 would still do an appropriate downgrading according to any of our apparatus/method embodiments.

The algorithmic components disclosed in this text may (entirely or in part) be realized in practice as hardware (e.g. parts of an application specific IC) or as software running on a special digital signal processor, or a generic processor, etc. They may be semi-automatic in a sense that at least some user input may be/have been (e.g. in factory, or consumer input, or other human input) present.

It should be understandable to the skilled person from our presentation which components may be optional improvements and can be realized in combination with other components, and how (optional) steps of methods correspond to respective means of apparatuses, and vice versa. The fact that some components are disclosed in the invention in a certain relationship (e.g. in a single figure in a certain configuration) doesn't mean that other configurations are not possible as embodiments under the same inventive thinking as disclosed for patenting herein. Also, the fact that for pragmatic reasons only a limited spectrum of examples has been described, doesn't mean that other variants cannot fall under the scope of the claims. In fact, the components of the invention can be embodied in different variants along any use chain, e.g. all variants of a creation side like an encoder may be similar as or correspond to corresponding apparatuses at a consumption side of a decomposed system, e.g. a decoder and vice versa. Several components of the embodiments may be encoded as specific signal data in a signal for transmission, or further use such as coordination, in any transmission technology between encoder and decoder, etc. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" or "system" is also intended to be used in the broadest sense, so it may comprise inter alia a single physical, purchasable apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, to execute any of the characteristic functions of an invention. In particular, the computer program product may be realized as data on a carrier such as e.g. a disk or tape, data present in a memory, data traveling via a network connection—wired or wireless—, or program code on paper. Apart from program code, characteristic data required for the program may also be embodied as a computer program product. Such data may be (partially) supplied in any way.

The invention or any data usable according to any philosophy of the present embodiments like video data, may also be embodied as signals on data carriers, which may be removable memories like optical disks, flash memories, removable hard disks, portable devices writeable via wireless means, etc.

Some of the steps required for the operation of any presented method may be already present in the functionality of the processor or any apparatus embodiments of the invention instead of described in the computer program product or any unit, apparatus or method described herein (with specifics of the invention embodiments), such as data input and output steps, well-known typically incorporated processing steps such as standard display driving, etc. We also desire protection for resultant products and similar resultants, like e.g. the specific novel signals involved at any step of the methods or in any subpart of the apparatuses, as well as any new uses of such signals, or any related methods.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim, nor is any particular symbol in the drawings. The word "comprising" does not exclude the presence of elements or aspects not listed in a claim. The word "a" or "an" preceding an element does not exclude the presence of a plurality of such elements.

The invention claimed is:

1. An image color processing apparatus arranged to transform an input color having a linear red, green and blue color component representation of a pixel of an input image, which input image has a first luminance dynamic range, into a linear red, green and blue color component output color of a pixel of an output image, which output image has a second luminance dynamic range, whereby the peak luminance of the first dynamic range is at least 2 times higher than the peak luminance of the second dynamic range or vice versa, comprising connected in successive order:
   a maximum determining unit arranged to calculate a maximum of the linear red, green and blue color components of the input color;
   a uniformization unit arranged to apply a function to the maximum as input, which function has a logarithmic shape and was predetermined to be of a fixed shape enabling to transform a linear input to a more perceptually uniform output variable;
   a function application unit arranged to receive a non-decreasing non-linear functional shape of a function which is a previously specified custom function, which function application unit is configured to have access to that previously specified custom function, and which function application unit is arranged to apply that previously specified custom function to the uniform output variable, yielding a transformed uniform value;
   a linearization unit arranged to transform the transformed uniform value to a linear domain value;
   a multiplication factor determination unit arranged to determine a multiplication factor being equal to the linear domain value divided by the maximum; and
   a multiplier arranged to multiply the linear red, green and blue color components by the multiplication factor, yielding the output color.

2. An image color processing apparatus as claimed in claim 1, comprising in between the uniformization unit and the function application unit a coarse mapping unit arranged to apply a coarse soft-clipping brightening function which is formed by a number of connected function segments which together span the input domain range of the function, and which are controlled by respective segment shape control parameters, which can be specified previously.

3. An image color processing apparatus as claimed in claim 2, in which the coarse mapping unit is arranged to apply a three-segment curve which consists of a linear segment for the darkest input values, which is controlled by a slope variable, a second linear segment for the lightest input values, which is controlled by a second slope variable, and a parabolic segment in between the two linear segments.

4. An image color processing apparatus as claimed in claim 1 in which the input image is a high dynamic range image, and the output image is a low dynamic range image.

5. A method of image color processing to transform an input color having a linear red, green and blue color component representation of a pixel of an input image which input image has a first luminance dynamic range, into a linear red, green and blue color component output color of a pixel of an output image, which output image has a second luminance dynamic range, whereby the peak luminance of the first dynamic range is at least 2 times higher than the peak luminance of the second dynamic range or vice versa, comprising:
   calculating a maximum of the linear red, green and blue color components of the input color;
   applying a uniformization function to the maximum as input, which function has a logarithmic shape and was predetermined to be of a fixed shape enabling to transform a linear input to a perceptually uniform output variable;
   receiving parameters defining a non-decreasing non-linear functional shape of a function, which was previously specified, and applying that function to the uniform output variable, yielding a transformed uniform value;
   transforming the transformed uniform value to a linear domain value applying a linearization function;
   determining a multiplication factor being equal to the linear domain value divided by the maximum; and
   multiplying the linear red, green and blue color components by the multiplication factor, yielding the output color.

6. A method of image color processing to transform an input color as claimed in claim 5, comprising between the steps applying a uniformization function and applying the function (CC) a step of: applying a coarse soft-clipping brightening function which is formed by a number of connected function segments which together span the input domain range of the function, and which are controlled by respective segment shape control parameters, which have been specified previously.

7. A method of image color processing to transform an input color as claimed in claim 6, in which the step of applying a coarse soft-clipping brightening function is characterized by applying a three-segment curve which consists of a linear segment for the darkest input values, which is controlled by a slope variable, a second linear segment for the lightest input values, which is controlled by a second slope variable, and a parabolic segment in between the two linear segments.

8. A method of image color processing as claimed in claim 1, in which the input image is a high dynamic range image, and the output image is a low dynamic range image.

9. A computer program product comprising a computer-readable device, encoded with controlled instructions for executing the steps of claim 1, thereby when run enabling a processor to perform that method.

10. An image color processing apparatus arranged to transform an input color having a linear red, green and blue color component representation of a pixel of an input image, which input image has a first luminance dynamic range, into a linear red, green and blue color component output color of a pixel of an output image, which output image has a second luminance dynamic range, whereby the peak luminance of the first dynamic range is at least 2 times higher than the peak luminance of the second dynamic range or vice versa, comprising:
 a maximum determining unit arranged to calculate a maximum of the linear red, green and blue color components of the input color;
 a uniformization unit arranged to apply a function the maximum as input, which function has a logarithmic shape and was predetermined to be of a fixed shape enabling to transform a linear input to a more perceptually uniform output variable;
 a coarse mapping unit arranged to arranged to apply a three-segment curve which consists of a linear segment for the darkest input values, which is controlled by a slope variable, a second linear segment for the lightest input values, which is controlled by a second slope variable, and a parabolic segment in between the two linear segments, and arranged to output a transformed uniform value;
 a linearization unit arranged to transform the transformed uniform value to a linear domain value;
 a multiplication factor determination unit arranged to determine a multiplication factor being equal to the linear domain value divided by the maximum; and
 a multiplier arranged to multiply the linear red, green and blue color components by the multiplication factor, yielding the output color.

11. A method of image color processing to transform an input color having a linear red, green and blue color component representation of a pixel of an input image, which input image has a first luminance dynamic range, into a linear red, green and blue color component output color of a pixel of an output image, which output image has a second luminance dynamic range, whereby the peak luminance of the first dynamic range is at least 2 times higher than the peak luminance of the second dynamic range or vice versa, comprising:
 calculating a maximum of the linear red, green and blue color components of the input color;
 applying a uniformization function to the maximum as input, which function has a logarithmic shape and was predetermined to be of a fixed shape enabling to transform a linear input to a perceptually uniform output variable;
 applying a three-segment curve which consists of a linear segment for the darkest input values, which is controlled by a slope variable, a second linear segment for the lightest input values, which is controlled by a second slope variable, and a parabolic segment in between the two linear segments, yielding a transformed uniform value;
 transforming the transformed uniform value to a linear domain value by applying a linearization function;
 determining a multiplication factor being equal to the linear domain value divided by the maximum; and
 multiplying the linear red, green and blue color components by the multiplication factor, yielding the output color.

12. A video decoder comprising:
an input for receiving an input image;
an image decoding unit arranged to decode the input image to a linear red, green and blue color component pixellized representation, and arranged to receive metadata characterizing at least luminance processing functions;
an image color processing apparatus as claimed in claim 1, wherein the image color processing apparatus is arranged to receive and process the input image by applying the luminance processing functions functions as defined by the received metadata, and to yield a linear red, green and blue color component pixellized output image.

13. A video encoder comprising:
an input for receiving an input image;
an image color processing apparatus as claimed in claim 1, wherein the image color processing apparatus is arranged to process the input image by applying luminance transformation functions, and to yield a linear red, green and blue color component pixellized output image; and
an image encoding unit arranged to encode output image to an encoded output image and arranged to output metadata characterizing at least luminance processing functions.

* * * * *